No. 640,048. Patented Dec. 26, 1899.
M. TAYLOR.
GAS PRODUCER.
(Application filed Nov. 2, 1899.)
(No Model.)
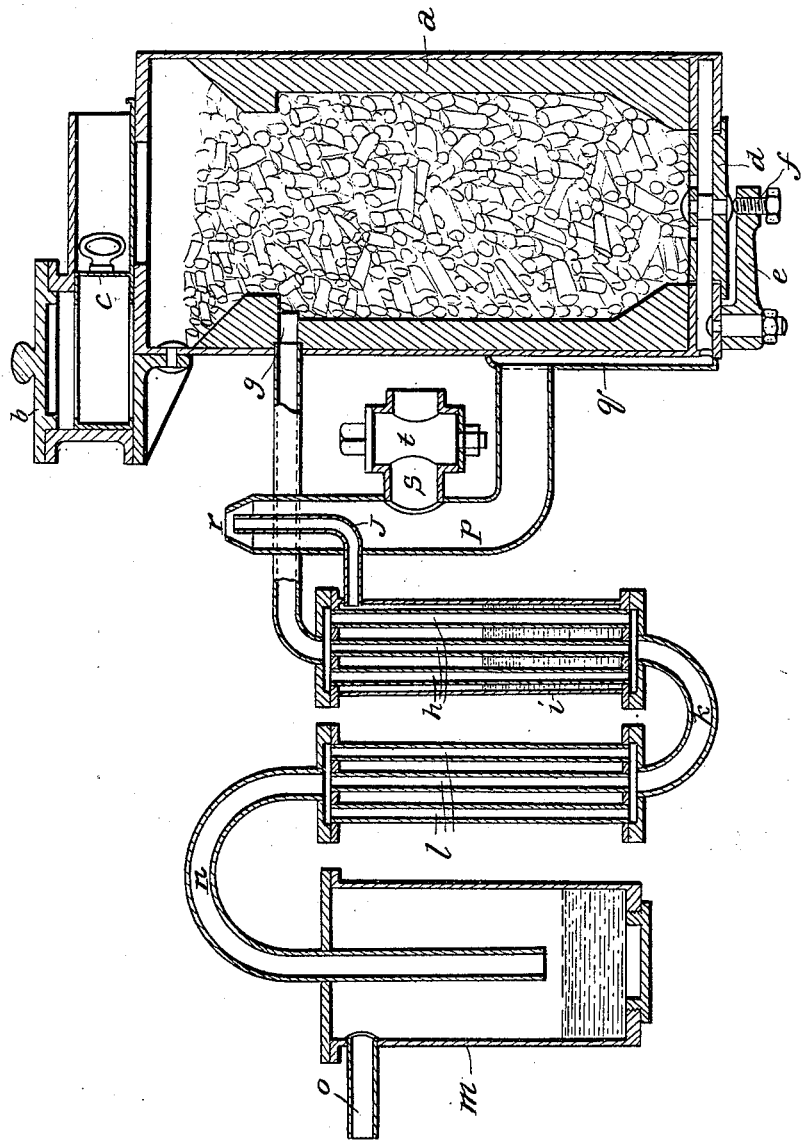
Witnesses:
Inventor
Maurice Taylor
By James L. Norris.
Attorney.

United States Patent Office.

MAURICE TAYLOR, OF PARIS, FRANCE.

GAS-PRODUCER.

SPECIFICATION forming part of Letters Patent No. 640,048, dated December 26, 1899.

Original application filed February 1, 1899, Serial No. 704,136. Divided and this application filed November 2, 1899. Serial No. 735,617. (No model.)

*To all whom it may concern:*

Be it known that I, MAURICE TAYLOR, a citizen of the Republic of France, residing at Paris, Department of the Seine, France, have invented certain new and useful Improvements in Gas-Producers, (being a division of my application filed February 1, 1899, Serial No. 704,136,) of which the following is a specification.

The object of this invention is to provide a gas-producer which is of small weight and is without any scrubber requiring a current of water and which will supply richer gas than the ordinary poor gas-producers and which can easily be regulated and kept in repair. The producer is applicable for use in all cases where a cleanly and simple installation requiring little attendance is desired, and in particular it will be found serviceable for autocar high locomotive and like traction. It will feed a gas-engine drawing in gas direct by means of its working piston.

With these objects this invention consists in certain special features of construction forming a novel apparatus, which I will proceed to describe.

The accompanying drawing, forming part of this specification, represents a vertical section of my gas-producing apparatus.

The apparatus consists of a gas-producer $a$, wherein the fuel is placed, such fuel being admitted through a door $b$ and a charging-slide $c$, so that the producer contains a supply of fuel sufficient for a number of hours' operation and a further supply is charged in through the sliding door $c$, as required.

The fuel is supported by a grate formed with or secured to the cleaning-door $d$, which can be quickly opened and closed by means of a pivoted lever $e$ and a screw $f$.

The gas issues from the producer through an orifice $g$ and attached pipe and passes through tubes $h$, surrounded by the water, which is contained in a tank $i$, which communicates with another tank having a float whereby the water therein is maintained at a constant level.

Under the action of the heat of the gases passing through the tubes $h$ the water in the first-mentioned tank $i$ becomes converted into vapor and passes into the furnace along with the air in proper proportion.

Upon leaving the before-mentioned tubes $h$ the gas passes by a pipe $k$ into tubes $l$, which are cooled by contact with the air or other cooling medium, the cooling-surfaces of such tubes being sufficient to effect the complete cooling of the gas as it passes through them.

On leaving the tubes $l$ the gas passes by a pipe $n$ into a chamber $m$, containing water, the pipe $n$ terminating a little above the surface of the water in the chamber $m$, so that the gas impinges on such water, and ashes and dust contained in the gas are retained upon or in the water, while the cooled and cleansed gas passes to the engine through a suitable pipe $o$.

As the gas is cold when admitted into the chamber $m$, containing the water, the said water is not evaporated and will serve its purpose for a considerable time—say all day. Before setting the apparatus in operation the water charged with ashes and dust should be drawn off and a fresh charge of clean water be substituted.

An air and steam supply pipe $p$ at one end opens into a jacket $q$, which envelops or partly envelops the lower part of the gas-producer and opens under the grate at the base of the furnace. The said pipe $p$ is contracted at its upper end $r$. The steam under constant pressure is conveyed from the vaporizer $h$ through the before-mentioned pipe $j$, the end of which is directed toward the orifice of contracted pipe $p$, so that when the engine does not draw in gas from the gas-producers the steam escapes into the atmosphere through the said orifice $r$.

Upon the contracted pipe $p$ between the furnace of the gas-producer and the point where the steam-pipe $j$ opens there is an air-inlet pipe $s$, the admission of air being controlled by means of a cock $t$.

In the apparatus described the pressure of the steam is constant, it being precisely the pressure which is required to cause such steam to circulate through the system of pipes and to escape in proportion as it is produced. If it were necessary that the pressure of such steam while constant should be higher than the pressure attained in the manner first stated, it will suffice to provide ordinary constant-pressure feeders in the vaporizer.

When the fire has been lighted at the level $g$ and covered over with charcoal, so as to fill the gas-producer, the engine is set in operation, the pipe of such engine, which serves to draw in gas, having first been connected with the gas-pipe $o$.

I will suppose the air and steam to have been mixed in the requisite proportions in the manner hereinafter described. As a result of the suction exercised by the motor such air and steam will pass from the contracted-ended pipe $p$ to beneath the grate and through the fuel in the furnace, where in consequence of the oxygen contained in the air and of the steam coming into contact with the red-hot charge they will become converted into a gas consisting of carbonic oxide, hydrogen, and nitrogen. The gas thus formed is conveyed to the engine through the passages $g\ k\ n\ o$ and chambers hereinbefore described. While passing through the tubes $g\ h$ in the tank $i$, containing water, it will heat the water, which as it becomes vaporized supplies the steam required for the production of gas. In passing from these tubes through the passages hereinbefore referred to, $k\ l\ n$, the gas is cooled, and on passing into the chamber $m$, containing cold water, the gas gets rid of its impurities by coming in contact with the water. Lastly, the said gas proceeds through the pipe $o$ to the engine in a cooled and cleansed condition.

The arrangement for regulating the proportions of the air and steam drawn in to produce gas operates as follows:

As the engine operates to draw in a charge if the air-inlet cock $t$ be closed all the steam is carried into the gas-producer by the air entering through the orifice $r$ of the contracted pipe $p$, so that a mixture as rich as possible in steam is drawn in. If, however, the cock $t$ on this contracted pipe $p$ be fully opened while the engine is drawing in, air enters through such cock and fills the vacuum formed in the gas-producer, while the steam, owing to its pressure, escapes through the contracted orifice $r$, so that air only is drawn into the gas-producer.

If the air-inlet passage $s$ for air to the contracted pipe $p$ be throttled by means of the cock $t$, a draft of air through the contracted orifice will form in proportion as such air-inlet contracts, and the current of air thus created will carry a proportionate quantity of steam along with it into the producer, such quantity being in all cases equal, given the same aperture of the cock $t$.

When the exhausting action of the engine does not take place, either in consequence of the action of the regulator or because the piston is going through the other phases of the cycle, the whole of the steam will escape through the contracted orifice $r$, and none will enter the gas-producer. It will be understood that owing to this arrangement a mixture of air and steam in any desired proportions can be drawn into the gas-producer and that no steam can enter the gas-producer unless it be mixed with air in suitable proportion, this being an indispensable condition for maintaining in the furnace a temperature sufficiently high to insure a satisfactory decomposition of the air and steam.

From the time of drawing in the air and steam until the gas generated enters the engine the current meets with no resistance calculated to interfere with its circulation, except that offered by the friction in the passages and that which results from the passing of the gas through the charcoal. As charcoal forms no slag, the grate never becomes clogged, and its sectional area, together with that of the spaces remaining free between the pieces of charcoal, are in all cases larger than the sectional area of the pipes through which the gas is conducted. The resistance offered to the gas as it is drawn into the engine is therefore not greater than that encountered in petroleum-carburizers, and inasmuch as a gas-engine operates perfectly well where its working piston draws in gas into a carburizer its operation will be quite as satisfactory where it is made to draw in a gaseous mixture through the apparatus hereinbefore described.

Having thus described my invention, what I claim is—

1. The combination of a fuel-receptacle, a cooling-tank with pipes, a connection between said tank and receptacle, a chamber with tubes connected with the cooling-tank, a pipe leading to the said receptacle and having a contracted outer end, and a pipe leading from the cooling-tank and terminating within the last-mentioned pipe, as and for the purpose specified.

2. The combination of the fuel-receptacle, a cooling-tank, a connection between the same, tubes within the tank, a pipe leading to the receptacle and having a contracted end, a pipe leading from the cooling-tank and terminating within the contracted end of the said pipe, and an interposed device for regulating the proportions of air and steam drawn in to produce the gas, as set forth.

3. The combination of the fuel-receptacle, the cooling-tank with pipes, the connection between the receptacle and tank, the pipe leading from the jacket around the receptacle and contracted at its outer end, and a steam-pipe leading from the cooling-tank into the said pipe and terminating within the same, as and for the purpose specified.

4. The combination of the fuel-receptacle, the grate and a jacket around the lower portion thereof, a pipe leading from said jacket with its upper end contracted, a tank with pipes, a connection between the same and the receptacle, a steam-pipe leading from the tank and terminating within the contracted end of the air-pipe, and an air-inlet with valve between the said jacket and the point where the steam-pipe enters the air-pipe, as and for the purpose specified.

5. The combination with the furnace and the cooling-tank, of an air and steam tube under constant pressure, said air-tube having a contracted open end and the steam-tube terminating therein, the discharging-orifice of the steam-tube being opposite to the air-entrance, whereby discharge of the steam is permitted when the motor fails to draw it in, substantially as specified.

In testimony whereof I have hereunto set my hand in presence of two subscribing witnesses.

MAURICE TAYLOR.

Witnesses:
J. ALLISON BOWEN,
ALFRED FREY.